United States Patent
Kamini et al.

(10) Patent No.: US 11,157,019 B2
(45) Date of Patent: Oct. 26, 2021

(54) METHODS AND SYSTEMS FOR INTERACTING WITH AND CONTROLLING MULTIPLE VEHICLES AT ONCE

(71) Applicant: GM GLOBAL TECHNOLOGY OPERATIONS LLC, Detroit, MI (US)

(72) Inventors: Aditya S. Kamini, Bloomfield Hills, MI (US); Chakradhar V. Velvadapu, Northville, MI (US); Richard L. Elswick, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 16/395,570

(22) Filed: Apr. 26, 2019

(65) Prior Publication Data
US 2020/0341491 A1    Oct. 29, 2020

(51) Int. Cl.
*G05D 1/02* (2020.01)
*G08G 1/00* (2006.01)
*G05D 1/00* (2006.01)

(52) U.S. Cl.
CPC ......... *G05D 1/0297* (2013.01); *G05D 1/0027* (2013.01); *G08G 1/207* (2013.01); *G05D 2201/0213* (2013.01)

(58) Field of Classification Search
CPC ............... G05D 1/0297; G05D 1/0027; G05D 2201/0213; G05D 1/0291; G05D 1/0022; G05D 1/0011; G08G 1/207
See application file for complete search history.

(56) References Cited

U.S. PATENT DOCUMENTS

| | | | | |
|---|---|---|---|---|
| 10,410,516 B1* | 9/2019 | Andersson | ......... | G06K 9/00825 |
| 10,459,444 B1* | 10/2019 | Kentley-Klay | ...... | G05D 1/0027 |
| 2008/0000959 A1* | 1/2008 | Faoro | ...................... | G08G 1/20 235/375 |
| 2009/0190735 A1* | 7/2009 | Gilmartin | ............... | G10L 17/00 379/201.12 |
| 2010/0179844 A1* | 7/2010 | LaFergola | ................ | G07C 5/08 701/31.4 |
| 2018/0239352 A1* | 8/2018 | Wang | ................... | B60W 30/182 |
| 2019/0061619 A1* | 2/2019 | Reymann | .............. | G05D 1/0212 |
| 2019/0357005 A1* | 11/2019 | Brady | ................ | G06Q 10/0631 |

* cited by examiner

*Primary Examiner* — Aaron L Troost
(74) *Attorney, Agent, or Firm* — Lorenz & Kopf LLP (57) ABSTRACT

In exemplary embodiments, methods, communication systems, and vehicle systems are provided. In one exemplary embodiment, a vehicle system is provided that includes a fleet of vehicles and a remote server. The remote server is remote from the fleet of vehicles, and includes a transceiver and a processor. The transceiver is configured to receive, over a wireless communication network, a communication with a request for a command to be performed by the fleet of vehicles. The processor is configured to: (A) identify a plurality of vehicles of the fleet of vehicles subject to the command; and (B) provide instructions for each of the plurality of vehicles to perform a vehicle action corresponding to the command.

15 Claims, 2 Drawing Sheets

METHODS AND SYSTEMS FOR INTERACTING WITH AND CONTROLLING MULTIPLE VEHICLES AT ONCE

TECHNICAL FIELD

The technical field generally relates to vehicles, and more particularly relates to communications with and control of vehicles.

Certain vehicles today have features that allow a user to remotely interact with and control a vehicle. It may be desirable to provide further remote interaction with and control of vehicles.

Accordingly, it may be desirable to provide improved methods and systems for interacting with and controlling vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes: (i) receiving a communication with a request for a command to be performed by a plurality of vehicles; (ii) identifying the plurality of vehicles subject to the command; and (iii) providing instructions, via a processor, for each of the plurality of vehicles to perform a vehicle action corresponding to the command.

Also in one embodiment, the step of receiving the communication includes receiving the request for the plurality of vehicles to turn off respective engines of the vehicles; and the step of providing the instructions includes providing the instructions, via the processor, for each of the plurality of vehicles to turn off the respective engines of the vehicles.

Also in one embodiment, the step of receiving the communication includes receiving the request for the plurality of vehicles to turn on respective engines of the vehicles; and the step of providing the instructions includes providing the instructions, via the processor, for each of the plurality of vehicles to turn on the respective engines of the vehicles.

Also in one embodiment, the step of receiving the communication includes receiving the request for the plurality of vehicles to lock respective doors of the vehicles; and the step of providing the instructions includes providing the instructions, via the processor, for each of the plurality of vehicles to lock the respective doors of the vehicles.

Also in one embodiment, the step of receiving the communication includes receiving the request for the plurality of vehicles to unlock respective doors of the vehicles; and the step of providing the instructions includes providing the instructions, via the processor, for each of the plurality of vehicles to unlock the respective doors of the vehicles.

Also in one embodiment, the step of receiving the communication includes receiving the request for the plurality of vehicles to honk a horn of the vehicles; and the step of providing the instructions includes providing the instructions, via the processor, for each of the plurality of vehicles to honk the respective horns of the vehicles.

Also in one embodiment, the receiving of the communication and the providing of the instructions are both performed via a transceiver via a wireless communication network.

Also in one embodiment, the step of receiving the communication includes receiving the communication with the request for the command, the command to be performed by each the plurality of vehicles in a fleet of vehicles; the step of identifying the plurality of vehicles subject to the command including identifying the plurality of vehicles in the fleet of vehicles; and the step of providing the instructions includes providing the instructions, via the processor, for each of the plurality of vehicles to perform the vehicle action corresponding to the command.

Also in one embodiment, the step of receiving the communication includes receiving the communication with the request for the command, the command to be performed by each the plurality of vehicles in the fleet of vehicles that are within a predetermined geo-fence boundary; the step of identifying the plurality of vehicles subject to the command including identifying the plurality of vehicles in the fleet of vehicles that are within the predetermined geo-fence boundary; and the step of providing the instructions includes providing the instructions, via the processor, for each of the plurality of vehicles that are within the predetermined geo-fence boundary to perform the vehicle action corresponding to the command.

Also in one embodiment, method further includes: determining, via the processor, whether each of the plurality of vehicles is capable of performing the vehicle action; wherein the step of providing the instructions comprises providing the instructions only to those vehicles of the plurality of vehicles that are capable of performing the vehicle action.

Also in one embodiment, the method further includes: confirming which of the plurality of vehicles have successfully performed the vehicle action; and providing a report with respect to which of the plurality of vehicles have successfully performed the vehicle action.

In another exemplary embodiment, a communication system is disclosed that includes: (a) a transceiver configured to receive, over a wireless communication network, a communication with a request for a command to be performed by a plurality of vehicles; and (b) a processor configured to: (i) identify the plurality of vehicles subject to the command; and (ii) provide instructions for each of the plurality of vehicles to perform a vehicle action corresponding to the command.

Also in one embodiment: the transceiver is configured to receive the request for the plurality of vehicles to turn off or turn on respective engines of the vehicles; and the processor is configured to provide the instructions for each of the plurality of vehicles to turn off or turn on the respective engines of the vehicles.

Also in one embodiment: the transceiver is configured to receive the request for the plurality of vehicles to lock or unlock respective doors of the vehicles; and the processor is configured to provide the instructions for each of the plurality of vehicles to lock or unlock the respective doors of the vehicles.

Also in one embodiment: the transceiver is configured to receive the request for the plurality of vehicles to honk a horn of the vehicles; and the processor is configured to provide the instructions, via the processor, for each of the plurality of vehicles to honk the respective horns of the vehicles.

Also in one embodiment: the transceiver is configured to receive the communication with the request for the command, the command to be performed by each the plurality of vehicles in a fleet of vehicles that are within a predetermined geo-fence boundary; and the processor is configured to: identify the plurality of vehicles in the fleet of vehicles that are within the predetermined geo-fence boundary; and provide the instructions, via the processor, for each of the plurality of vehicles that are within the predetermined geo-fence boundary to perform the vehicle action corresponding to the command.

Also in one embodiment: the processor is configured to: determine whether each of the plurality of vehicles is capable of performing the vehicle action; and provide the instructions only to those vehicles of the plurality of vehicles that are capable of performing the vehicle action.

Also in one embodiment: the processor is configured to: confirm which of the plurality of vehicles have successfully performed the vehicle action; and provide a report with respect to which of the plurality of vehicles have successfully performed the vehicle action.

In another exemplary embodiment, a vehicle system is provided that includes: (a) a fleet of vehicles; and (b) a remote server that is remote from the fleet of vehicles, the remote server including: (i) a transceiver configured to receive, over a wireless communication network, a communication with a request for a command to be performed by the fleet of vehicles; and (ii) a processor configured to: (A) identify a plurality of vehicles of the fleet of vehicles subject to the command; and (B) provide instructions for each of the plurality of vehicles to perform a vehicle action corresponding to the command.

Also in one embodiment, the transceiver is configured to receive the communication with the request for the command, the command to be performed by each the plurality of vehicles in the fleet of vehicles that are within a predetermined geo-fence boundary; and the processor is configured to: identify the plurality of vehicles in the fleet of vehicles that are within the predetermined geo-fence boundary; and provide the instructions, via the processor, for each of the plurality of vehicles that are within the predetermined geo-fence boundary to perform the vehicle action corresponding to the command.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
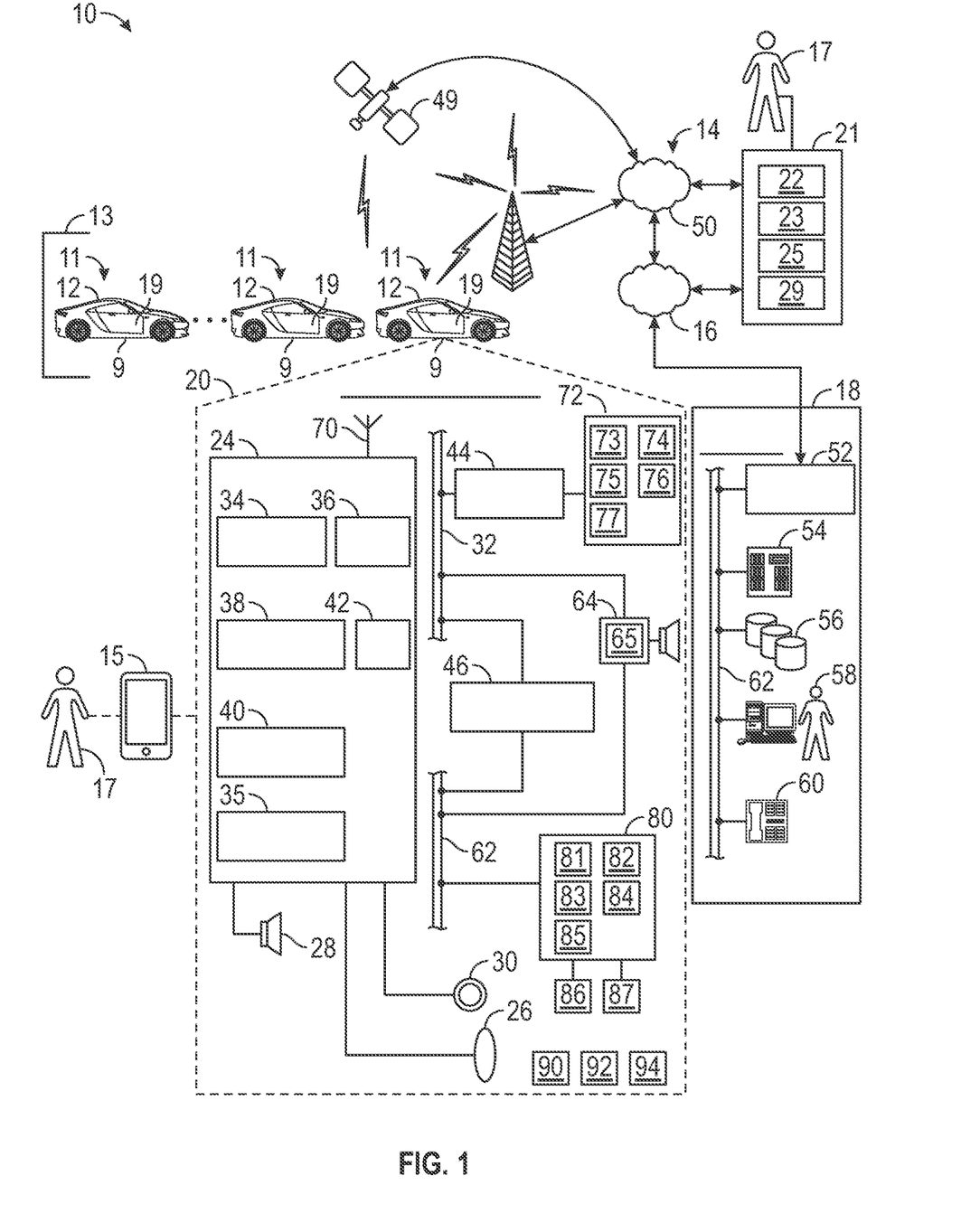
FIG. 1 is a functional block diagram of a communications system that includes a plurality of vehicles (e.g., a fleet), and that is configured to provide for remote interaction with and control of the vehicles at the same time, in accordance with exemplary embodiments.

FIG. 1 is a functional block diagram of a communications system 10, in accordance with an exemplary embodiment. As described in greater detail further below, the communications system 10 includes a plurality (or fleet) 11 of vehicles 12. Also as described in greater detail further below, the communications system 10 is configured to provide one or more users 17 remote interaction with and control of the various vehicles 12 in the fleet 11 at the same time.

As depicted in FIG. 1, the communications system 10 generally includes the above-referenced vehicles 12 in the fleet 11, along with one or more wireless carrier systems 14, one or more land networks 16, and one or more remote servers 18. As described in greater detail further below, in various embodiments, the communications system 10 provides one or more users 17 with remote interaction with and control of the vehicles 12 in the fleet 11 at the same time, with automatic vehicle actions performed by the various vehicles 12 in the fleet 17 at the same time upon command by the users 17. In various embodiments, the users 17 provide instructions for the vehicle interaction and control via a user electronic device 15 (e.g., a mobile phone, tablet, or other electronic device) and/or one or more other computer systems 21 described further below, which may be part of (and/or, in certain embodiments, coupled to) the communications system 10. In certain embodiments, certain some or all of the vehicles 12 in the fleet 11 are disposed together in a common geo-fenced location (or region) 13, such as a garage. In other embodiments, the vehicles 12 in the fleet 11 may be disposed in any number of different geographic locations.

It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, each vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, each vehicle includes a body 9 and one or more doors 19, as well as one or more engines (e.g., gasoline combustion and/or electric), locks 92 for the doors 19, and a horn 94 for the vehicle 12. Also in various embodiments vehicle hardware 20 is disposed within the body 9 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a transceiver 35, a wireless modem 36, a dual mode antenna 70, and a navigation unit containing a GPS chipset/component 42. In one example, the wireless modem 36 includes a computer program and/or set of software routines adapted to be executed within electronic processing device 38. Also in various embodiments, the transceiver 35 is configured to receive instructions from the user 17 regarding control of the vehicle 12, and to transmit information pertaining thereto to the user 17 and/or other vehicles 12 in the fleet 11.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including the connection and communication with the electronic device(s) 15 and computer system(s) 21 of users 17 of the vehicles 12, and interaction with and control of the vehicles 12 via the users 17. In various embodiments, the electronic device 15 may include a mobile phone, such as a smart phone. In certain other embodiments, the device 15 may include, by way of example, various other different consumer electronic/mobile devices, such as a keyfob, a laptop, a smart wearable device, a tablet computer, a network computer, and/or one or more other electronic devices and/or combinations thereof. Also in various embodiments, the user computer system 21 may include any number of desktop computers, laptop computers, notebook computers, mainframe computers, computer networks, and/or other computer devices.

In various embodiments, the telematics unit 24 detects and communicates with the electronic device 15 and the computer system 21 while connected to a wireless network within a wireless range of the vehicle 12. In various embodiments, the telematics unit 24 and each electronic device 15 and computer system 21 exchange data (either directly and/or indirectly via the remote server 18), including the exchange of identifiers of the various devices and systems, instructions from the users 17 for control of the vehicles 12, and information pertaining thereto (e.g., information as to a verification of the user 17, as well as to whether the vehicles 12 are able to perform specific instructions from the user, and as to whether the vehicles 12 have performed the specific instructions, and so on). In various embodiments, a voice assistant, chatbot, and/or one or more other features are provided for communication (e.g., via the electronic device 15 and/or computer system 21) between the user 17 and the vehicles 12 and/or the remote server 18 and for receiving and implementing commands from the user 17.

In addition, in various embodiments, the telematics unit 24 may also provide other services, such as, by way of example: turn-by-turn directions and other navigation-related services provided in conjunction with the GPS chipset/component 42, emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32. The audio component 64 receives analog information, rendering it as sound, via the vehicle bus 32. Digital information is also received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32. In various embodiments, the audio component 64 includes radio system 65 (which also includes antenna 70, as well as amplifiers, speakers, and the like, in certain embodiments).

Vehicle sensors 72, connected to various sensor interface modules 44 are operatively connected to the vehicle bus 32. In various embodiments, the vehicle sensors 72 include detection sensors 73, input sensors 74, engine sensors 75, door sensors 76, and horn sensors 77, described below. In various embodiments, the vehicle sensors 72 may also include any number of other sensors, such as by way of example, wheel speed sensors, accelerometers, steering angle sensors, braking system sensors, gyroscopes, magnetometers, emission detection, and/or control sensors, and the like. Example sensor interface modules 44 include powertrain control, climate control, and body control, to name but a few.

In various embodiments, the detection sensors 73 detect and communicate with the user 17's electronic device 15.

For example, in various embodiments, the detection sensors 73 detect the electronic device 15 and receive a unique identifier thereof (e.g., a MAC address of a mobile phone) in order to help identify the user 17 of the vehicle 12 and receive instructions therefrom. In certain embodiments, the detection sensors 73 include one or more Bluetooth low energy (BLE) sensors 73 that are disposed within or on the vehicle 12 (e.g., on or within the body 9 of the vehicle 12). In certain embodiments, the detection sensors 73 are utilized in connection with one or more short-range wireless connection (SRWC) protocols (e.g., Bluetooth/Bluetooth Low Energy, or Wi-Fi).

Also in various embodiments, the input sensors 74 are utilized to detect inputs from the user 17 with respect to operation of various vehicle components. For example, in various embodiments, the input sensors 74 detect requests by the user 17 to unlock or lock one or more locks 92 of one or more doors 19 of the vehicle 12, start and/or stop the engine 90 vehicle 12, honk one or more horns 94 of the vehicle 12. In certain embodiments, the input sensors 74 are part of and/or coupled to the user 17's electronic device 15 and/or one or more of the hardware components 20 and/or controls 30, and/or to one or more other vehicle modules 80, such as one or more engine control modules 81 (e.g., controlling operation of the motor/engine 90), door control modules 82 (e.g., controlling locking and/or unlocking the locks 92 of one or more doors 19 of the vehicle 12), horn modules 83 (e.g., controlling usage of the one or more horns 94), display modules 85 (e.g., providing audio and/or visual displays for the user, including notifications of the vehicle's 12 ability to execute the requested control actions, and confirmation when the requested control actions are taken), and/or other control modules that control different functionality for the vehicle 12, that may be connected to one another and to telematics unit 24 via the communications bus 62. For example, in various embodiments, the input sensors 74 may be part of and/or coupled to controls 30 for the electronic device 15 and/or to one or more hardware components 20 and/or various input devices 86 and/or display units 87 for use with other vehicle modules 80, such as one or more touch screens, push buttons, dials, switches, knobs, levers, or the like.

In various embodiments, the input sensors 74 are part of and/or coupled to one or more of the hardware components 20 and/or controls 30, and/or to one or more other vehicle modules 80, such as one or more body control modules, engine control modules, vehicle control modules, door modules, horn modules, display modules, and/or other modules that control different functionality for the vehicle 12, such as the vehicle 12's engine 90, door locks 92, and horn 94, that may be connected to one another and to telematics unit 24 via the communications bus 62. For example, in various embodiments, the input sensors 74 may be part of and/or coupled to controls 30 for hardware components 20 and/or various input devices 81 for use other vehicle modules 80, such as one or more touch screens, push buttons, dials, switches, knobs, levers, or the like. In various embodiments, the input sensors 74 are used to not only control the vehicle functionality for the hardware components 20 and/or other vehicle modules 80 to perform actions as requested by the user 17, but also to monitor the vehicle 17's ability to perform the requested actions, and to confirm that the vehicle 12 has indeed performed the requested actions. Also in various embodiments, this comparison of inputs is performed via a processor, such as the processor 38 of the telematics unit 24.

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54 (e.g., including one or more processors), databases 56 (e.g., including non-transitory computer readable memory), advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. In various embodiments, the database 56 of the remote server 18 comprises a computer memory that stores the identifiers (e.g., MAC addresses, IP addresses) for the respective electronic devices 15 and/or computer systems 21 (and/or e-mail, Internet, and/or other identifiers and/or other information pertaining thereto) and of the various users 17 that communicate with and control the vehicles 12 in the fleet 11. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data. In various embodiments, the remote server 18 also provides a voice assistant, chatbot, and/or one or more other features for communication (e.g., via the electronic device 15 and/or computer system 21) between the user 17 and the vehicles 12 and/or the remote server 18 and for receiving and implementing commands from the user 17.

Also in various embodiments, the computer system 21 of the user 17 includes one or more input devices 22, processors, 23, transceivers 25, and memory 29. In various embodiments, the input devices 22 (e.g., of or including touch screens, keyboards, computer mice, buttons, knobs, joysticks, voice sensors, and so on) receive inputs from the user 17 as to one or more control actions for the vehicles 12 in the fleet 11 (e.g., to lock or unlock the doors 19 via the locks 92 thereof, turn on or off the engines 90, honk the horns 94, and so on). Also in various embodiments, the processor processes such requests, information pertaining thereto, and responses from the vehicle 12 and information pertaining thereto. In addition, in certain embodiments, the transceiver 25 transmits information (e.g., the user requests) to the vehicles 12, and receives information (e.g., the user 17's identity and verification thereof, the vehicle 12's ability to perform the user requests, and confirmation that the vehicle 12 has completed the requests, and so on). Also in various embodiments, the memory 29 stores information pertaining to eh vehicles 12, for example including a history of the user requests and performance thereof by the vehicles 12, and so on.

Figure 2:
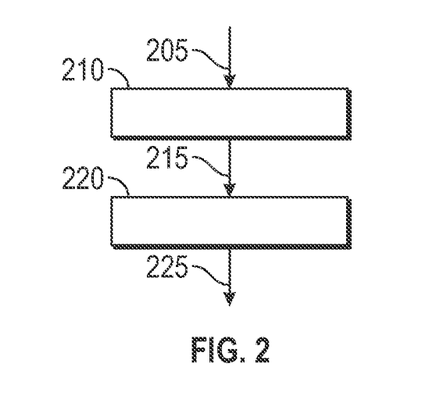
FIG. 2 is a block diagram of modules of the communications system of FIG. 1, in accordance with exemplary embodiments.

FIG. 2 provides a functional block diagram for modules 200 of the communications system 10 of FIG. 1, in accordance with exemplary embodiments. In various embodiments, each module includes and/or utilizes computer hardware, for example via one or more computer processors and memory. As depicted in FIG. 2, in various embodiments, the communications system 10 generally includes a data module 210 and a processing module 220. In various embodiments, the data module 210 and processing module 220 are disposed, at least in part, onboard the vehicle 12. In certain embodiments, the processing module may be disposed, at least in part, as part of the remote server 18 of FIG. 1, and/or the user 17's electronic device 15 and/or computer system 21.

In various embodiments, the data module 210 communicates with the user 17's electronic device 15 and computer system 21 of FIG. 1. In various embodiments, the data module 210 receives instructions from the user 17 (e.g., via the electronic device 15 and/or computer system 21) pertaining to one or more control actions for the vehicles 12 (e.g., locking the doors 19, turning the engine 90 on or off, honking the horn 94, and so on). Also in various embodiments, the data module 210 also receives information pertaining to the identity of the user 17 and verification thereof, as well as the vehicle 12's ability to perform the requested control action as well as whether the vehicle 12 has successfully performed the control action (e.g., via various vehicle sensors 72 of FIG. 1).

Also in various embodiments, the data module 210 provides information pertaining to the data (including as to the user instructions and the verification of the user, as well as the ability of the vehicles 12 to perform the requested control actions and confirmation of the vehicle 12's successful performance of the control actions) as outputs 215 of the data module 210 for use by the processing module 220, for example as discussed below.

In various embodiments, the processing module 220 utilizes the data from the data module 210 as inputs 215 for the processing module 220, and controls operations of the vehicles 12 and interaction with the user 17 based on the data. Specifically, in various embodiments, the processing module 220 retrieves, from a memory, a pre-programmed, stored sequence of inputs associated with the user 17 (e.g., associated with the identifier of the electronic device 15 of the user 17), and takes appropriate action when this sequence of inputs is detected while the user 17 is in the vehicle 12. In various embodiments, these steps are utilized by one or more processors (such as the processor 38 of the vehicle 12) using computer memory (e.g., the database/memory 56 of the remote server 18), for example in accordance with the process 300 described below in connection with FIG. 3. In certain embodiments, such instructions are provided by the processing module 220 as outputs 225 depicted in FIG. 2 to the one or more of the hardware components 20 and/or other vehicle modules 80 of FIG. 1 (e.g., an engine control module 81, door module 82, and/or horn module 83) for controlling one or more vehicle actions (e.g., turning the engine on or off, locking or unlocking the doors, honking the horn, and so on in accordance with the user's command(s)).

Figure 3:
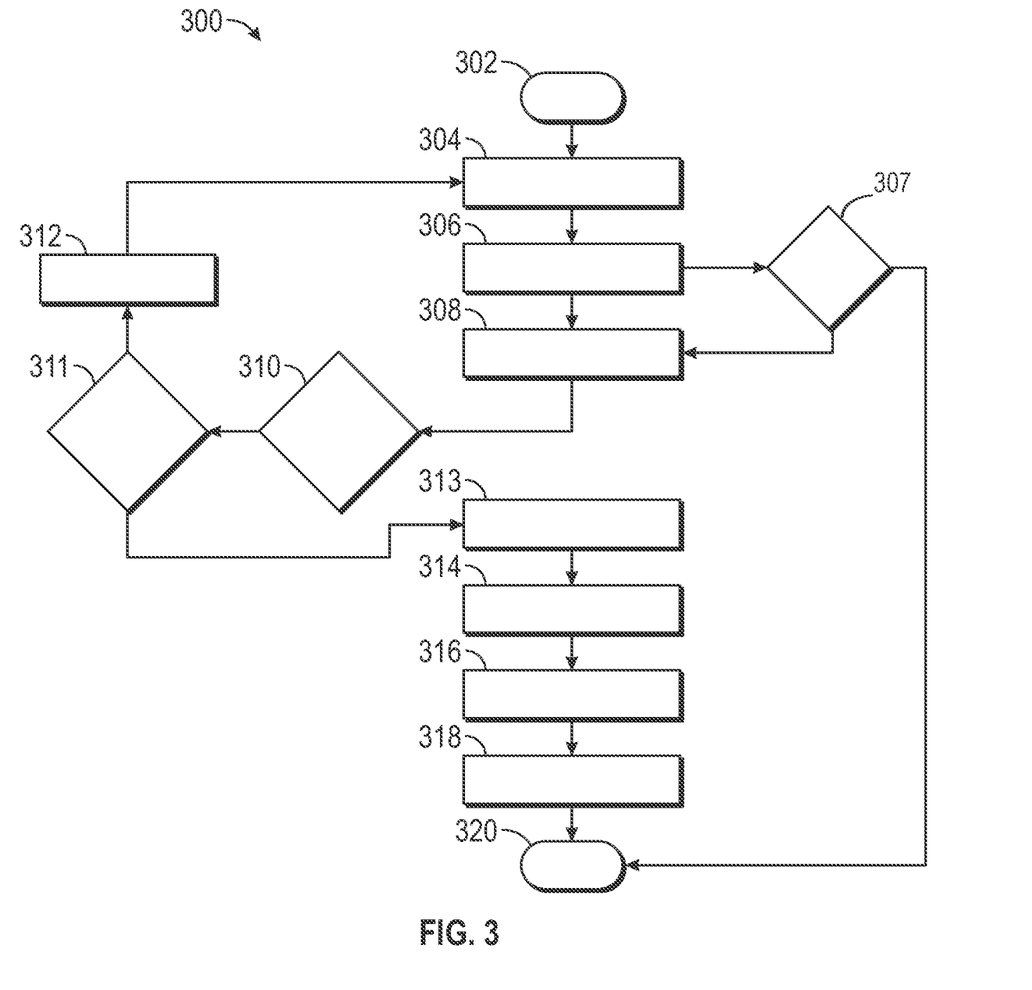
FIG. 3 is a flowchart of a process for remote interaction with and control of a plurality of vehicles at the same time, and that can be used in connection with the communications system of FIGS. 1 and 2, including the vehicles thereof of FIG. 1 and the modules of FIG. 2, in accordance with exemplary embodiments.

FIG. 3 is a flowchart of a process 300 for remote interaction with and control of a plurality of vehicles at the same time. In various embodiments, the process 300 can be used in connection with the communications system 10 of FIG. 1, including the fleet 11 of vehicles 12, the remote server 18, the user electronic device 15, and the user computer system 21 thereof, the components thereof of FIG. 1, and the modules 200 thereof of FIG. 2, in accordance with exemplary embodiment.

As depicted in FIG. 3, in various embodiments the process 300 begins at step 302. In certain embodiments, the process 300 begins when one or more users 17 of the vehicle 12 approaches or enters a vehicle 12, and/or provides a communication and/or input via the user device 15, computer system 21, and/or input sensor 74 with respect to one or more of the vehicles 12.

In various embodiments, a request is received from a user at step 304. In various embodiments, the user request is made by a user 17 of the fleet 11 of vehicles 12 of FIG. 1, for example, via the user 17's electronic device 15 and/or computer system 21 (and/or, in some embodiments, as detected via the input sensors 74 of FIG. 1), via one or more transceivers (e.g., transceivers 25 and/or 35 of FIG. 1) using one or more wireless communications protocols and/or networks (e.g., using one or more of networks 14 and/or 16 of FIG. 1). In certain embodiments, the command is received and implemented via a user's interaction with a voice assistant or chatbot. In other embodiments, the command is received and implemented in connection via a user's interaction with an advisor, and/or via any number of different voice sensors, touch screens, input devices, buttons, knobs, controls, or the like, such as those of or associated with the user 17's electronic device 15 and/or computer system 21 and/or the input sensors 74 of FIG. 1. In various embodiments, the user request comprises one or more requests for commands to be automatically performed for each of the vehicles 12 in the fleet 11 (or a specific subset thereof) at the same time. In certain embodiments, the user commands comprise one or more of the following: starting (or turning on) the engine 90, stopping (or turning off) the engine 90, one or more other techniques for restricting driving or operation of the vehicle (e.g., preventing the engine 90 from being turned on), locking the doors 19, unlocking the doors 19, and/or honking the horn 94 of each of the vehicle 12 in the fleet (among other various possible commanded actions in various other embodiments). In certain embodiments, the command pertains to all vehicles 12 in the fleet 11, to be performed at the same time. In certain other embodiments, the command pertains to all vehicles 12 in the fleet 11 that are within a particular geofence region (such as region 13) (e.g., in certain embodiments, all vehicles within a certain specific garage or other structure, or in certain other embodiments, all vehicles within a certain city, county, state, country, and/or other specific geographic region, and so on), to be performed at the same time.

Also in various embodiments, the user is identified and verified at step 306. In certain embodiments, a user 17 of FIG. 1 is identified based on a detected identifier for the electronic device 15 and/or computer system 21 of FIG. 1 (and/or an Internet, e-mail, and/or other account utilized by the user 17). In certain other embodiments, the user 17 is identified based on entry of a password from the user 17, for example via the user 17's electronic device 15 and/or computer system 21. In various embodiments, a processor (e.g., of the servers 54 of the remote server 18 of FIG. 1) compares one or more passwords and/or identifiers obtained as part of step 306 and compares the passwords and/or other identifiers stored in a computer memory (such as of the databases 56 of the remote server 18 of FIG. 1) for verification of the user 17.

In various embodiments, a determination is made at step 307 as to whether the verification of the user has been successful. In various embodiments, this determination is made by a processor, such as a processor of the servers 54 of the remote server 18 of FIG. 1. In certain embodiments, if it is determined that the user has not been successfully verified, then the process terminates at step 320. Conversely, in certain embodiments, if the user has been successfully verified, then process proceeds to step 308, described below.

During step 308, data is obtained pertaining to the vehicles. Specifically, in various embodiments, one or more processors (e.g., of the servers 54 of the remote server 18 of FIG. 1) obtains information pertaining to each of the vehicles 12 of the fleet 11 of FIG. 1, including GPS and/or other navigation data, as well as data from the vehicle sensors 72 of FIG. 1 as to the states of the various vehicle systems that may pertain to the user command (e.g., the engine status, driving status, door status, lock status, horn status, and so on for each of the vehicles).

During step 310, an identification is made as to which vehicles 12 are subject to the user command(s) of step 304 (e.g., including which vehicles 12 are within any specified geo-fence region associated with the user command(s), and so on). In various embodiments, the identification of step 310 is performed by one or more processors (e.g., the processors of the server 54 and/or the processor 38 of FIG. 1).

Also in various embodiments, for each vehicle 12 that is subject to the user command(s), a determination is made at step 311 as to whether the vehicle 12 is capable of performing the user requested command(s). For example, in certain embodiments: (i) a particular vehicle 12 may not be able to turn its engine 90 on if the vehicle 12 has a dead battery; (ii) a particular vehicle 12 may not be able to safely turn its engine 90 off if the vehicle 12 is being operated on a certain type of roadway, such as a freeway or highway with traffic; (iii) a particular vehicle 12 may not be able to lock its doors 19 if the doors 19 are open, the locks 92 are broken and/or jammed, or the like; (iv) a particular vehicle 12 may not be able to unlock its doors 19 if the locks 92 are broken and/or jammed; (v) a particular vehicle 12 may not be able to honk its horn 94 if the horn 94 is broken, and so on. In various embodiments, the determinations of step 311 are made for each vehicle 12 by one or more processors (e.g., a processor of the servers 54 of the remote server 18 and/or the processors 38 of the respective vehicles 12 of FIG. 1) using data from the various vehicle sensors 72 of FIG. 1.

In various embodiments, if it is determined that the vehicle 12 is not capable of performing the particular command, then a report is provided at step 312 with respect to the vehicles 12 that cannot perform the command. Specifically, in various embodiments, a processor (such as a processor of the servers 54 of FIG. 1) provides a notification to the user 17 regarding the inability of the vehicle(s) 12 to perform the requested command. In various embodiments, the report may be provided, by way of example, to the user 17's electronic device 15 and/or computer system 21 of FIG. 1, and/or in certain embodiments via the display unit(s) 87 of the vehicles 12. In certain embodiments, the process then returns to step 304 in a new iteration once a new request has been received.

Conversely, if it is determined that the vehicle 12 is capable of performing the particular command, then the process proceeds to step 313, described below, in which commands are provided. It will be appreciated that in various embodiments, the process may simultaneously proceed to step 311 (for example, for one subset of vehicles 12 that cannot perform the command) as well as to step 312 (for example, for a second subset of vehicles 12 that can perform the command).

In various embodiments, command(s) are provided at step 313 for the vehicles 12 that have been determined to be capable of performing the requested command(s). Specifically, in various embodiments, a processor (such as a processor of the servers 54 of FIG. 1) provides instructions for each of the capable vehicles 12 to automatically perform one or more vehicle actions to execute the requested commands from step 304 (e.g., to start the engine, turn off the engine, lock the doors, unlock the doors, honk the horn, and/or one or more other requested commands). In various embodiments, the instructions are provided via one or more transceivers (e.g., transceivers 25 and/or 35 of FIG. 1) using one or more wireless communications protocols and/or networks (e.g., using one or more of networks 14 and/or 16 of FIG. 1) for the automatic performance by the vehicles 12 of the requested vehicle action in accordance with the user command. Also in various embodiments, the commands are then automatically executed by the vehicle at the same time at step 314 (e.g., based on instructions provided by the processors 38 of the respective vehicles 12 to the engine, 90, locks 92, horn 94, and/or respective modules 81, 82, 83 of the respective vehicles 12).

Also in various embodiments, for each vehicle 12 that has been provided a command in step 313, determinations are made as to whether the vehicle 12 has in fact performed the requested command. In various embodiments, such determinations are made for step 313 for each vehicle 12 by one or more processors (e.g., a processor of the servers 54 of the remote server 18 and/or the processors 38 of the respective vehicles 12 of FIG. 1) using data from the various vehicle sensors 72 of FIG. 1.

In addition, in various embodiments, a confirmation report is provided at step 318. In various embodiments, during step 318, a processor (such as a processor of the servers 54 of FIG. 1) provides a notification to the user 17 regarding confirmations as to which of the vehicle(s) 12 have successfully performed the requested command. In various embodiments, the report may be provided, by way of example, to the user 17's electronic device 15 and/or computer system 21 of FIG. 1, and/or in certain embodiments via the display unit(s) 87 of the vehicles 12. In certain embodiments, the process then terminates at step 320.

Accordingly, in accordance with various embodiments, methods, systems, and vehicles are provided that provide a user with remote interaction with and control for a fleet of vehicles. In various embodiments, the user makes a request via the user's electronic device or computer system. Also in various embodiments, the disclosed methods, systems, and vehicles verify the user, verify that the vehicles are able to perform the requested actions, initiate the requested actions, and verify the successful performance of the requested actions.

It will be appreciated that the systems and methods may vary from those depicted in the Figures and described herein. For example, the communications system of FIG. 1, including the remote server, the vehicles, the electronic devices, the computer systems, the communications networks, and/or components thereof, may vary from that depicted in FIG. 1 and/or described herein, in various embodiments. It will similarly be appreciated that the modules may vary from the depictions in FIG. 2 and the accompanying descriptions. It will also be appreciated that the process (and/or subprocesses) disclosed herein may differ from those described herein and/or depicted in FIG. 3, and/or that steps thereof may be performed simultaneously and/or in a different order as described herein and/or depicted in FIG. 3, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A method comprising:
receiving a communication with a request for a command to be performed by a plurality of vehicles within a predetermined geofence;
identifying, via a processor, the plurality of vehicles subject to the command, based on whether each of the plurality of vehicles is disposed within the predetermined geofence;
determining, via the processor, whether each of the plurality of vehicles is capable of performing an automatic vehicle control action based on a state of the vehicle and a roadway on which the vehicle is located;
taking the automatic vehicle control action, for each of the identified vehicles, that simultaneously and automatically restricts driving operation of each of the identified vehicles, based on instructions provided by the processor, corresponding to the command, such that the vehicle control action is executed for each of the plurality of vehicles at the same time, when the plurality of vehicles are capable of performing the automatic vehicle control action; and
providing a notification, instead of taking the automatic vehicle control action, when one or more of the identified vehicles are not physically capable of performing the vehicle control action.

2. The method of claim 1, wherein:
the step of receiving the communication comprises receiving the request for the plurality of vehicles to turn off respective engines of the identified vehicles; and
the step of taking the automatic vehicle control action comprises automatically and simultaneously turning off respective engines of each of the identified vehicles, based on the instructions provided by the processor.

3. The method of claim 1, wherein:
the step of receiving the communication comprises receiving the request for the plurality of vehicles to turn on respective engines of the identified vehicles; and
the step of taking the automatic control action comprises automatically and simultaneously turning on the respective engines of each of the identified vehicles.

4. The method of claim 1, wherein:
the step of receiving the communication comprises receiving the request for the plurality of vehicles to lock respective doors of the identified vehicles; and
the step of taking the automatic control action comprises automatically and simultaneously locking the respective doors of each of the identified vehicles.

5. The method of claim 1, wherein:
the step of receiving the communication comprises receiving the request for the plurality of vehicles to unlock respective doors of the identified vehicles; and
the step of taking the automatic control action comprises automatically and simultaneously unlocking the respective doors of each of the identified vehicles.

6. The method of claim 1, wherein:
the step of receiving the communication comprises receiving the request for the plurality of vehicles to honk a horn of the identified vehicles; and
the step of taking the automatic control action comprises automatically and simultaneously honking the respective horns of each of the identified vehicles.

7. The method of claim 1, further comprising:
confirming which of the identified vehicles have successfully performed the vehicle control action; and
providing a report with respect to which of the identified vehicles have successfully performed the vehicle control action.

8. The method of claim 1, wherein:
the receiving step comprises receiving the communication with respect to the request for the command to be performed by a plurality of vehicles within a particular garage;
the identifying step comprises identifying, via the processor, the plurality of vehicles subject to the command, based on whether each of the plurality of vehicles is disposed within the particular garage; and
the step of taking the automatic vehicle control action comprises taking the automatic vehicle control action, for each of the identified vehicles in the particular garage, that simultaneously and automatically restricts driving operation of each of the identified vehicles that are in the particular garage, based on instructions provided by the processor corresponding to the command.

9. The method of claim 1, wherein the determining of whether each of the plurality of vehicles is capable of performing the automatic vehicle control action is based on whether the vehicle is being operated on a highway.

10. The method of claim 1, wherein the determining of whether each of the plurality of vehicles is capable of performing the automatic vehicle control action is based on an amount of traffic on a roadway in which the vehicle is travelling.

11. A communication system comprising:
a transceiver configured to receive, over a wireless communication network, a communication with a request for a command to be performed by a plurality of vehicles within a predetermined geofence; and a processor configured to:
  identify the plurality of vehicles subject to the command, based on whether each of the plurality of vehicles is disposed within the predetermined geofence;
  determine whether each of the plurality of vehicles is capable of performing an automatic vehicle control action based on a state of the vehicle and a roadway on which the vehicle is located;
  take an automatic vehicle control action, for each of the identified vehicles, that simultaneously and automatically restricts driving operation of each of the identified vehicles, based on instructions provided by the processor corresponding to the command, such that the vehicle control action is executed for each of the plurality of vehicles at the same time, when the plurality of vehicles are capable of performing the automatic vehicle control action; and
  provide a notification, instead of taking the automatic vehicle control action, when one or more of the identified vehicles are not physically capable of performing the vehicle control action.

12. The communication system of claim 11, wherein:
the transceiver is configured to receive the request for the plurality of vehicles to turn off respective engines of the identified vehicles; and
the processor is configured to automatically and simultaneously turn off the respective engines of each of the identified vehicles.

13. The communication system of claim 11, wherein:
the transceiver is configured to receive the request for the plurality of vehicles to lock respective doors of the identified vehicles; and
the processor is configured to automatically and simultaneously lock the respective doors of each of the identified vehicles.

14. The communication system of claim 11, wherein:
the transceiver is configured to receive the request for the plurality of vehicles to honk a horn of the identified vehicles; and
the processor is configured to automatically and simultaneously honk the respective horns of each of the identified vehicles.

15. A vehicle system comprising:
a fleet of vehicles; and
a remote server that is remote from the fleet of vehicles, the remote server including:
  a transceiver configured to receive, over a wireless communication network, a communication with a request for a command to be performed by the fleet of vehicles, provided that such vehicles are within a predetermined geofence; and
  a processor configured to:
    identify a plurality of vehicles of the fleet of vehicles subject to the command, based on whether each of the plurality of vehicles is disposed within the predetermined geofence;
    determine whether each of the plurality of vehicles is capable of performing an automatic vehicle control action based on a state of the vehicle and a roadway on which the vehicle is located;
    perform a vehicle control action for each of the plurality of vehicles corresponding to the command, such that the vehicle control action is executed for each of the plurality of vehicles at the same time, when the plurality of vehicles are capable of performing the automatic vehicle control action; and
    provide a notification, instead of taking the automatic vehicle control action, when one or more of the identified vehicles are not physically capable of performing the vehicle control action.

* * * * *